US008342009B2

(12) United States Patent
Murphy

(10) Patent No.: US 8,342,009 B2
(45) Date of Patent: Jan. 1, 2013

(54) METHOD FOR DETERMINING STEAMPATH EFFICIENCY OF A STEAM TURBINE SECTION WITH INTERNAL LEAKAGE

(75) Inventor: Peter John Murphy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 13/104,583

(22) Filed: May 10, 2011

(65) Prior Publication Data

US 2012/0285227 A1 Nov. 15, 2012

(51) Int. Cl.
*G01M 15/14* (2006.01)

(52) U.S. Cl. .................................. 73/112.02; 73/112.03

(58) Field of Classification Search ............... 73/112.02, 73/112.03

See application file for complete search history.

(56) References Cited

U.S. PATENT DOCUMENTS 4,136,643 A 1/1979 Aguet
4,403,476 A 9/1983 Johnson et al.
4,410,950 A * 10/1983 Toyoda et al. .................. 701/99
4,844,162 A 7/1989 Maassen et al.
4,852,344 A 8/1989 Warner
4,958,985 A 9/1990 Davids et al.
4,976,100 A 12/1990 Lee
5,056,989 A 10/1991 Turner et al.
5,120,192 A 6/1992 Ohtomo et al.
5,218,815 A 6/1993 Korenberg
5,236,349 A 8/1993 Fabris
5,362,072 A 11/1994 Dalton
5,464,226 A 11/1995 Dalton
5,564,269 A 10/1996 Briesch
5,730,070 A 3/1998 Kunkel et al.
5,886,895 A * 3/1999 Kita et al. ........................ 700/28
5,954,859 A 9/1999 Keskar et al.
6,038,851 A 3/2000 Shiba
6,139,604 A 10/2000 Gottzmann et al.
6,220,013 B1 4/2001 Smith
6,244,033 B1 6/2001 Wylie
6,305,901 B1 * 10/2001 Bell et al. ...................... 415/100
6,336,789 B1 1/2002 Beerens et al.
6,354,798 B1 3/2002 Deckers
6,367,258 B1 4/2002 Wen et al.
6,394,459 B1 5/2002 Florin
6,491,493 B1 12/2002 Watanabe et al.
6,529,849 B2 * 3/2003 Umezawa et al. ............ 702/136
6,557,348 B2 5/2003 Lange, Jr. et al.
6,591,225 B1 7/2003 Adelman et al.
6,631,858 B1 10/2003 Farineau et al.
6,763,560 B2 7/2004 McGee et al.

(Continued)

*Primary Examiner* — Freddie Kirkland, III
(74) *Attorney, Agent, or Firm* — Nixon & Vanderhye PC

(57) ABSTRACT

A method of more accurately measuring steam turbine efficiency is disclosed in which the sealing steam in the steam turbine is re-routed so that a more accurate measure of steam turbine efficiency can be made. Some of the steam entering a turbine goes into the turbine's end pack and then mixes with the steam that goes through the turbine. Piping is added from one of the end pack line's to the condenser. This added line has a valve, pressure, temperature and flow measuring devices. As the valve is opened, the amount of flow going to the end pack line allowing the end pack steam mix with the steam that goes through the turbine is reduced. As the flow in this line is reduced the measured temperature at the turbine exhaust will also decrease. The amount that the valve is opened is increased until either the exhaust temperature has reached a minimum, or the enthalpy in the pipe changes from the initial enthalpy.

21 Claims, 1 Drawing Sheet

U.S. PATENT DOCUMENTS 6,776,577 B1 8/2004 Chu et al.
6,901,348 B2 * 5/2005 Smith et al. ................... 702/182
6,980,928 B1 * 12/2005 Graichen et al. .............. 702/182
7,021,126 B1 * 4/2006 Badami et al. ............. 73/112.03
7,090,393 B2 8/2006 Loy et al.
7,195,455 B2 3/2007 Stonitsch et al.
7,273,348 B2 9/2007 Amirtharajah et al.
7,328,591 B2 2/2008 Holtzapple et al.
7,331,754 B2 2/2008 O'Clair et al.
7,344,357 B2 3/2008 Couture, Jr. et al.
7,357,618 B2 4/2008 Burdgick et al.
7,422,415 B2 9/2008 Burdgick et al.
7,540,708 B2 6/2009 Laurer et al.
7,634,385 B2 * 12/2009 Smith ........................... 702/182
7,645,117 B2 1/2010 Bracken et al.
7,658,073 B2 2/2010 Hernandez et al.
7,708,865 B2 5/2010 Holtzapple et al.
8,132,448 B2 * 3/2012 Nakamura et al. ......... 73/112.02
2009/0238679 A1 9/2009 Hernandez

* cited by examiner

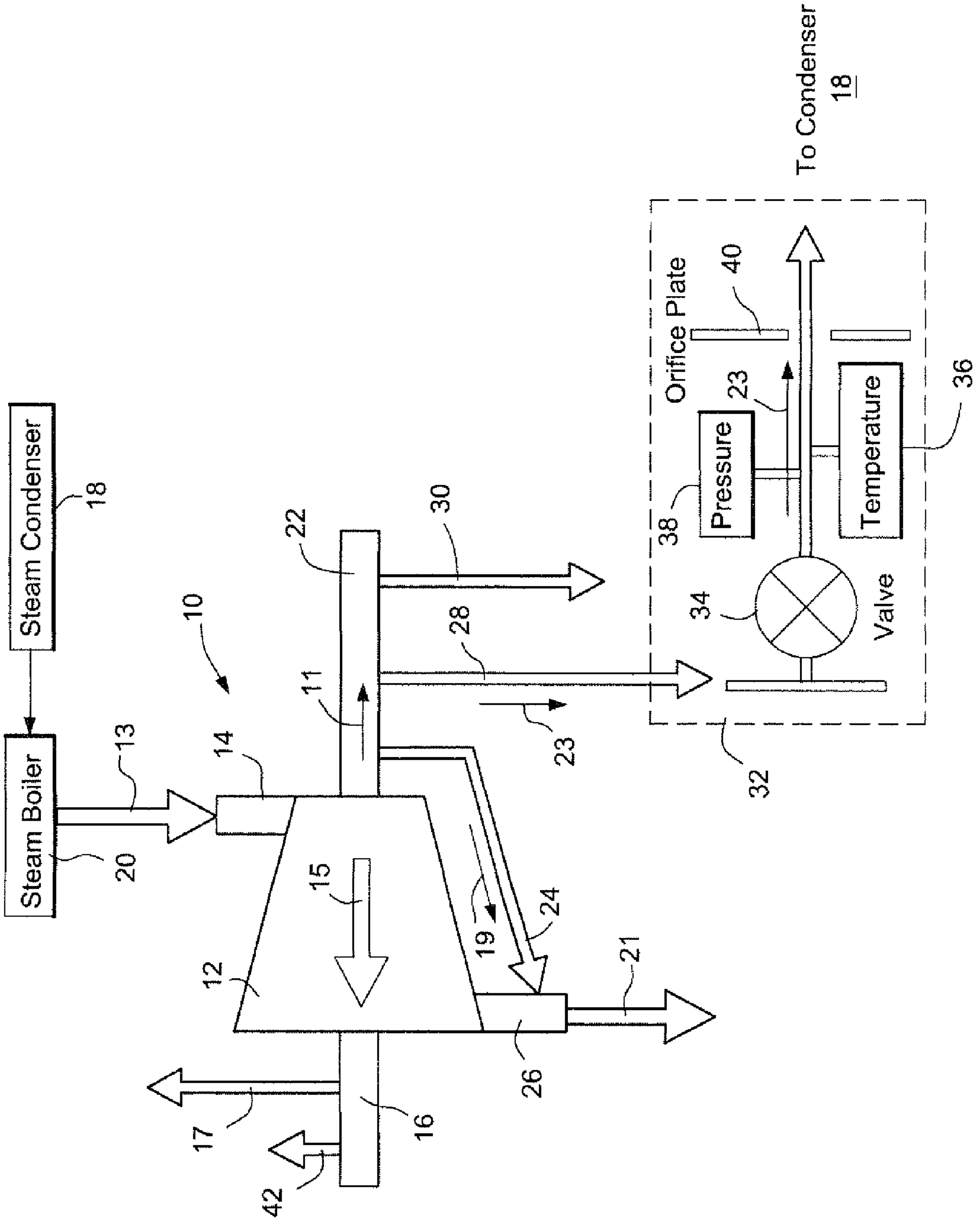
Steam Condenser
18
Steam Boiler
13
20
14
10
11
12
15
16
17
42
19
21
22
23
24
26
28
30
32
34
Valve
38
Pressure
23
Temperature
36
Orifice Plate
40
To Condenser
18

METHOD FOR DETERMINING STEAMPATH EFFICIENCY OF A STEAM TURBINE SECTION WITH INTERNAL LEAKAGE

The present invention relates to turbines, and more particularly, to a method of re-routing the sealing steam in a steam turbine so that a more accurate measure of steam turbine efficiency can be made.

BACKGROUND OF THE INVENTION

Steam turbines are machines that are used to generate mechanical (rotational motion) power from the pressure energy of steam. Thus, a steam turbine's primary components are blades, which are designed to produce maximum rotational energy by directing the flow of steam along their surfaces. To maximize turbine efficiency, the steam is expanded (and thereby reduced in pressure) as it flows through the turbine, generating work in a number of stages of the turbine.

In some steam turbine designs, steam from the high pressure end packing is routed between the inner and outer shells of the turbine to provide sealing steam to the low pressure end packing of the turbine. Some of this sealing steam is allowed to re-enter the main steam flow after the last stage of the steam turbine. This steam re-enters the main steam flow before the pressure and temperature of the main steam flow can be measured. This causes the measured efficiency of the steam turbine to be lower than if there was no sealing steam entering the main steam flow.

The problem with current testing of steam turbine efficiency occurs when the measured steam turbine efficiency is less than the expected value. There are two possible causes for this situation. The first is that the internal leakage flow is higher than design, causing an increase in the turbine exhaust enthalpy. The second is that the steam path efficiency is lower than the design value. The current test procedure cannot determine which caused the decrease in performance.

BRIEF DESCRIPTION OF THE INVENTION

The present invention provides a method of temporarily re-routing the sealing steam in a steam turbine so that a more accurate measure of steam turbine efficiency can be made.

A method and system of more accurately measuring steam turbine efficiency are disclosed in which the sealing steam in the steam turbine is re-routed so that a more accurate measure of steam turbine efficiency can be made. Some of the steam entering a turbine goes into the turbine's high pressure end packing and then mixes with the steam that goes through the turbine. Piping is added from one of the end packing lines to the condenser. This added line has a valve, pressure, temperature and flow measuring devices. As the valve is opened, the amount of flow going to the end packing line increases, thereby causing a reduction in the amount of end packing steam that mixes with the steam that goes through the turbine. As the flow in this line is reduced, the measured temperature at the turbine exhaust will also decrease. The amount that the valve is opened is increased until either the exhaust temperature has reached a minimum, or the enthalpy in the pipe changes from the initial enthalpy.

In an exemplary embodiment of the invention, a method of more accurately measuring the efficiency of a steam turbine in which steam from the turbine's high pressure end packing is routed between the inner and outer shells of the turbine to provide sealing steam to the turbine's low pressure end packing and then returned to the main steam flow after the last stage of the steam turbine before the pressure and temperature of the main steam flow is measured comprises the step of temporarily re-routing the sealing steam to a steam condenser so that the efficiency of the steam turbine can be measured before the sealing steam is again returned to the main steam flow.

In another exemplary embodiment of the invention, a method of more accurately measuring the efficiency of a steam turbine in which steam from the turbine's high pressure end packing is routed between the inner and outer shells of the turbine to provide sealing steam to the turbine's low pressure end packing and then returned to the main steam flow after the last stage of the steam turbine before the pressure and temperature of the main steam flow is measured, the turbine's high pressure end packing including a first line that routes a portion of the sealing steam to a point where the portion of sealing steam is mixed with steam that travels through the turbine and a second line running between the end packing and a steam condenser comprises the step of using piping running between the second line and the condenser to control the amount of sealing steam flowing through the second line, and thereby the amount of sealing steam flowing through the first line, to thereby re-route the sealing steam to the condenser so that the sealing steam is at least temporarily separated from the main steam flow, whereby the efficiency of the steam turbine can be measured before the sealing steam again is returned to the main steam flow.

In a further exemplary embodiment of the invention, a system for more accurately measuring the efficiency of a steam turbine in which steam from the turbine's high pressure end packing is routed between the inner and outer shells of the turbine to provide sealing steam to the turbine's low pressure end packing and then returned to the main steam flow after the last stage of the steam turbine before the pressure and temperature of the main steam flow is measured comprises a first line connected to the end packing that routes a portion of the sealing steam to a point where the portion of sealing steam is mixed with steam that travels through the turbine, a second line running between the end packing and a steam condenser, and piping running between the second line and the condenser, which piping controls the amount of sealing steam flowing through the second line, and thereby the amount of sealing steam flowing through the first line, to thereby re-route the sealing steam to the condenser so that the sealing steam is at least temporarily separated from the main steam flow, whereby the efficiency of the steam turbine can be measured before the sealing steam again is returned to the main steam flow.

BRIEF DESCRIPTION OF THE DRAWINGS

FIG. 1 is a simplified turbine diagram with an arrangement for re-routing sealing steam so that a more accurate measurement of steam turbine efficiency can be made.

DETAILED DESCRIPTION OF THE INVENTION

FIG. 1 is a simplified diagram depicting an arrangement 10 for re-routing sealing steam 11 in a steam turbine 12 so that a more accurate measurement of the steam turbine's efficiency can be made.

As shown in FIG. 1, heated, high pressure steam 13 from a pressure vessel or steam boiler 20 enters steam turbine 12 at main steam inlet 14. A majority 15 of the high pressure steam 13 fed into steam turbine 12 passes along the turbine's axis through multiple rows of alternately fixed and moving blades (not shown). Steam turbine 12 uses the blades to extract energy from the high-pressure steam 15, so as to be rotated by the high pressure steam 15. The low pressure end packing 16 is fed by the high pressure end packing leak off 24. Part of this flow goes through the first leak off line 17. A second part of this flow goes through the second leak off line 42. The remainder of the flow mixes with the main steam flow 15 to form the exhaust steam 21.

A portion of the steam 13, called sealing steam 11, is routed into an end packing 22, which includes lines 24, 28 and 30. Sealing steam provides a seal for turbines that exhaust steam into a vacuum condenser, hence creating a better vacuum, and preventing non-condensables from entering the system.

A portion 19 of the sealing steam 11 routed into end packing 22 is routed through line 24, which is internal to steam turbine 12, to a point 26 where it is mixed with the steam 15 that travels through the turbine 12 to produce mixed exhaust steam 21. The mixed exhaust steam 21 can then be fed into a re-heater, another steam turbine, another process (not shown) or to the steam condenser 18.

In accordance with the present invention, a line is added from second line 28 running between end packing 22 and condenser 18. This added line 32 includes a valve 34, a pressure measuring device or gauge 38, a temperature measuring device or gauge 36 and a steam flow measuring device or gauge 40. As the valve 34 is opened, the amount of steam flow 19 going to line 24 is reduced. As the steam flow 19 in line 24 is reduced, the temperature measured at the turbine exhaust 21 will also decrease. This temperature will decrease because the amount of hot end packing steam 19 mixing with the colder main steam flow 15 has decreased, resulting in a lower mixed temperature. The amount that the valve 34 is opened is increased until either the temperature at turbine exhaust 26 has reached a minimum temperature or the enthalpy in pipe 32 changes from the initial enthalpy.

As discussed above, in some steam turbine designs, steam from the high pressure end packing is routed between the inner and outer shells of the turbine 12 to provide sealing to the low pressure end packing 16 of the turbine 12. Some of this sealing steam 11 is allowed to re-enter the main steam flow 15 after the last stage of the steam turbine 12. This steam re-enters the main steam flow before the pressure and temperature of the main steam flow 15 can be measured. This steam is the portion 19 of the sealing steam 11 routed through line 24 to turbine exhaust 26, where portion 19 of the sealing steam 11 is mixed with the steam 15 that travels through the turbine 12. This mixing causes the measured efficiency of the steam turbine 12 to be lower than if there was no sealing steam 19 entering the main steam flow.

As discussed above, the measured efficiency of the steam turbine 12 can be less than the expected value because the internal leakage flow of the turbine 12 is higher than design, which causes an increase in the turbine exhaust enthalpy, or because the steam path efficiency is lower than the design value. The present invention allows the two to be separated for the purpose of measuring turbine efficiency.

The arrangement shown in FIG. 1 provides a method of temporarily re-routing the sealing steam so that a more accurate measurement of steam turbine efficiency can be made. As explained above, as the valve 34 is opened, the amount of steam flow 19 going to line is reduced. As the steam flow 19 in line 24 is reduced, the temperature measured at the turbine exhaust also decreases. The amount that the valve 34 is opened is increased until either the temperature at turbine exhaust 26 has reached a minimum temperature or the enthalpy in pipe 32 changes from the initial enthalpy measured in pipe 32. The mixed exhaust steam 21 has a pressure and temperature. These measurements can be used, along with the steam properties to determine the enthalpy.

Mass flow of mixed steam 21=Mass flow of the main steam flow 15+Mass flow skimmer. (Eq. 1)

Mass flow skimmer=Mass flow of sealing steam portion 19−Mass flow in first leak off line 17−Mass flow in second leak off line 42. (eq. 2)

Enthalpy of mixed exhaust steam 21=(Mass flow skimmer*enthalpy of the high pressure input steam 13+Mass flow of the main steam flow 15*enthalpy of main steam flow 15)/Mass flow of mixed steam 21. (eq. 3)

Since the turbine 12 takes energy out of the steam flow 15, the enthalpy of the high pressure input steam 13 is greater than the enthalpy of the main steam flow 15. As the valve 34 is opened, the mass flow of the sealing steam portion 19 is reduced. The mass flow in first leak off line 17 and the mass flow in the second leak off line 42 are measured and should not change, such that Mass flow skimmer is reduced. This causes a reduction in the enthalpy of mixed exhaust steam 21. Since the Mass flow skimmer is much less than the mass flow of the main steam flow 15, the measured pressure at mixed exhaust steam 21 will not change significantly. So, the change in the enthalpy of mixed exhaust steam 21 will show up as a change in the measured temperature of the mixed exhaust steam 21.

The valve 34 is used to re-direct the high pressure end packing steam flow to the steam condenser 18 through line 28 and pipe 32. Pipe 32 is valved because sending the steam from the high pressure end packing to the condenser 18 results in a loss of overall cycle efficiency.

The pressure, temperature, and flow measuring device in line 28 and pipe 32 are required to determine the steam flow 23 and enthalpy in pipe 32. For most cases, the pressure and temperature measurements will result in the same enthalpy as the enthalpy of inlet steam flow 13. However, there is the possibility that the steam flow 23 going through line 28 and pipe 32 is large enough to cause the steam flow in line 19 to reverse. If this happens, then the enthalpy in pipe 32 will be equal to the enthalpy of the main steam flow 15.

Enthalpy is the thermodynamic function of a system. The total enthalpy of a system cannot be measured directly. Thus, a change in enthalpy is a more useful quantity, which is equal to the change in the internal energy of the system, plus the work that the system has done on its surroundings. It is typically measured in joules. The enthalpy is calculated from the measured pressure and temperature and the steam property formulations. Any change in pressure or temperature will result in a change in enthalpy.

For steam turbines the typical definition of turbine efficiency is the used energy divided by the available energy. Used energy is defined as the enthalpy of the high pressure input steam 13 minus the enthalpy of the main steam flow 15. Available energy is defined as enthalpy of the high pressure input steam 13 minus isentropic exhaust enthalpy. The isentropic exhaust enthalpy is determined by calculating the entropy at the turbine inlet 14 of the high pressure input steam 13, and then calculating the enthalpy at the turbine exit 26 from the measured pressure in the mixed exhaust steam 21 and the entropy at the inlet 14 of the high pressure input steam 13.

The commercial advantage of the present invention is trouble shooting steam turbines that are missing performance targets without opening up the unit. The technical advantage is better data for calibration of design tools.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of measuring the efficiency of a steam turbine in which steam from a high pressure end packing of the turbine is routed between the inner and outer shells of the turbine to provide sealing steam to a low pressure end packing of the turbine and then returned to a main steam flow after the last stage of the steam turbine before the pressure and temperature of the main steam flow is measured, the method comprising the step of temporarily re-routing the sealing steam to a steam condenser so that the efficiency of the steam turbine can be measured before the sealing steam is again returned to the main steam flow, the efficiency of the steam turbine being measured by dividing used energy by available energy.

2. The method of claim 1, wherein a high pressure end packing of the turbine includes a first line that routes a portion of the sealing steam to a point where the portion of sealing steam is mixed with the main steam that travels through the turbine and a second line running between the end packing and a steam condenser, and wherein the method further comprises the steps of adding between the second line and the condenser piping including a device to control the flow of sealing steam through the second line to the condenser, to thereby re-route a portion of sealing steam flowing through the first line to the second line and condenser so that the efficiency of the steam turbine can be measured before the sealing steam is returned to the main steam flow.

3. The method of claim 2, wherein the added piping includes a flow control valve, a pressure measuring device, temperature measuring device and a steam flow measuring device, and wherein the step of using the added piping to control the amount of sealing steam flowing through the second line, and thereby the amount of sealing steam re-routed from the first line includes opening the valve so that the amount of steam flowing through the first line is reduced so that the temperature measured at the turbine's exhaust will also decrease.

4. The method of claim 3, wherein the step of opening the valve so that the amount of steam flow through the first line is reduced is continued until either the turbine's exhaust temperature has reached a minimum temperature or the enthalpy in the added piping has changed from the initial enthalpy of the piping.

5. The method of claim 4, wherein the valve controls the amount of steam flow in the second pipe and the steam flow measuring device measures the amount of steam flow in the second pipe.

6. The method of claim 4, wherein the pressure measuring device and the temperature measuring device measure the change of enthalpy in the added piping.

7. The method of claim 4, wherein the valve is opened to an extent whereby the steam flow through the second line is large enough to cause the steam flow through the first line to reverse, such that the enthalpy in the second line is changed so as to be equal to the enthalpy of the main steam flow.

8. The method of claim 4, wherein the opening of the valve causes the high pressure end packing steam flow to be re-directed to the steam condenser.

9. The method of claim 1, wherein the efficiency of the steam turbine is measured by dividing used energy by available energy.

10. The method of claim 9, wherein used energy is defined as the enthalpy of the high pressure input steam minus the enthalpy of the main steam flow and available energy is defined as the enthalpy of the high pressure input steam minus isentropic exhaust enthalpy.

11. A method of more accurately measuring the efficiency of a steam turbine in which steam from a high pressure end packing of the turbine is routed between the inner and outer shells of the turbine to provide sealing steam to a low pressure end packing of the turbine and then returned to the main steam flow after the last stage of the steam turbine before the pressure and temperature of the main steam flow is measured, the turbine high pressure end packing including a first line that routes a portion of the sealing steam to a point where the portion of sealing steam is mixed with steam that travels through the turbine and a second line running between the end packing and a steam condenser, the method comprising the step of:

using piping running between the second line and the condenser and including a flow control device to control the amount of sealing steam flowing through the second line, and thereby the amount of sealing steam flowing through the first line, to thereby re-route the sealing steam to the condenser so that the sealing steam is at least temporarily separated from the main steam flow, whereby, before the sealing steam is returned to the main steam flow, the efficiency of the steam turbine is measured by dividing used energy by available energy.

12. The method of claim 11, wherein the piping includes a valve, and wherein the step of using the piping to control the amount of sealing steam flowing through the second line, and thereby the amount of sealing steam flowing through the first line includes opening the valve so that the amount of steam flow going to the first line is reduced so that the temperature measured at the turbine's exhaust will also decrease.

13. The method of claim 12, wherein the step of opening the valve so that the amount of steam flow going to the first line is reduced is continued until either the turbine's exhaust temperature has reached a minimum temperature or the enthalpy in the added piping has changed from the initial enthalpy of the piping.

14. The method of claim 13, wherein the piping further includes a steam flow measuring device, which measures the amount of steam flow in the second pipe.

15. The method of claim 14, wherein the piping further includes a pressure measuring device and a temperature measuring device, which together measure the change of enthalpy in the piping.

16. A system for more accurately measuring the efficiency of a steam turbine in which steam from a high pressure end packing of the turbine is routed between the inner and outer shells of the turbine to provide sealing steam to a low pressure end packing of the turbine and then returned to the main steam flow after the last stage of the steam turbine before the pressure and temperature of the main steam flow is measured, the system comprising:

a first line connected to the end packing that routes a portion of the sealing steam to a point where the portion of sealing steam is mixed with steam that travels through the turbine, a second line running between the end packing and a steam condenser, and piping running between the second line and the condenser, which piping controls with a flow control device the amount of sealing steam flowing through the second line, and thereby the amount of sealing steam flowing through the first line, to thereby re-route the sealing steam to the condenser so that the sealing steam is at least temporarily separated from the main steam flow, whereby the efficiency of the steam turbine can be measured before the sealing steam again is returned to the main steam flow, and whereby the amount of steam flow going to the first line is reduced and continued until either the turbine's exhaust temperature has reached a minimum temperature or the enthalpy in the added piping has changed from the initial enthalpy of the piping.

17. The system of claim 16, wherein before the sealing steam is returned to the main steam flow, the efficiency of the steam turbine is measured by dividing used energy by available energy.

18. The system of claim 16, wherein the piping includes a valve that is opened so that the amount of steam flow going to the first line is reduced, whereby the temperature measured at the turbine's exhaust will also decrease.

19. The system of claim 18, wherein the valve is open to a degree so that the amount of steam flow going to the first line is reduced and continued until either the turbine's exhaust temperature has reached a minimum temperature or the enthalpy in the added piping has changed from the initial enthalpy of the piping.

20. The system of claim 18, wherein the piping further includes a steam flow measuring device that measures the amount of steam flow in the second pipe.

21. The system of claim 18, wherein the piping further includes a pressure measuring device and a temperature measuring device that together measure the change of enthalpy in the piping.

* * * * *

UNITED STATES PATENT AND TRADEMARK OFFICE

CERTIFICATE OF CORRECTION

PATENT NO. : 8,342,009 B2
APPLICATION NO. : 13/104583
DATED : January 1, 2013
INVENTOR(S) : Murphy It is certified that error appears in the above-identified patent and that said Letters Patent is hereby corrected as shown below:

At column 3, line 19, delete “a line is added” and insert --a line 32 is added--

At column 3, line 59, delete “going to line is reduced” and insert --going to line 24 is reduced--

At column 3, lines 60-61, delete “at the turbine exhaust also decreases” and insert --at the turbine exhaust 16 also decreases--

Signed and Sealed this
Fifth Day of March, 2013

Teresa Stanek Rea
*Acting Director of the United States Patent and Trademark Office*